United States Patent [19]

Coffinberry

[11] Patent Number: 5,114,103
[45] Date of Patent: May 19, 1992

[54] AIRCRAFT ENGINE ELECTRICALLY POWERED BOUNDARY LAYER BLEED SYSTEM

[75] Inventor: George A. Coffinberry, West Chester, Ohio

[73] Assignee: General Electric Company, Cincinnati, Ohio

[21] Appl. No.: 572,825

[22] Filed: Aug. 27, 1990

[51] Int. Cl.$^5$ .................. B64C 21/06; B64D 13/06
[52] U.S. Cl. ........................... 244/209; 244/118.5; 244/134 R; 62/DIG. 5
[58] Field of Search ............... 244/209, 53 A, 118.5, 244/130, 134 R, 134 D, 204; 98/1.5; 62/323.3, DIG. 5

[56] References Cited

U.S. PATENT DOCUMENTS

| | | | |
|---|---|---|---|
| 2,728,246 | 12/1955 | Korkosz | 74/675 |
| 2,771,791 | 11/1956 | Bachman | 74/675 |
| 2,908,189 | 10/1959 | Parker et al. | 74/675 |
| 2,924,991 | 2/1960 | Whiting | 74/675 |
| 3,024,624 | 3/1962 | Morley | 62/402 |
| 3,260,133 | 7/1966 | Mattson | 74/675 |
| 3,298,251 | 1/1967 | Moss | 74/687 |
| 3,307,426 | 3/1967 | Whitaker | 74/675 |
| 3,428,242 | 2/1969 | Rannenberg | 230/116 |
| 3,514,945 | 6/1970 | Austin | 60/39.16 |
| 3,525,273 | 8/1970 | Brownstein | 74/675 |
| 3,596,524 | 8/1971 | Cook | 74/675 |
| 3,878,677 | 4/1975 | Colvin | 60/39.14 |
| 4,419,926 | 12/1983 | Cronin et al. | 98/1.5 |
| 4,494,372 | 1/1985 | Cronin | 244/118.5 X |
| 4,503,666 | 3/1985 | Christoff | 60/39.07 |
| 4,679,462 | 7/1987 | Baits et al. | 74/687 |
| 4,684,081 | 8/1987 | Cronin | 62/DIG. 5 X |
| 4,706,908 | 11/1987 | Huffman et al. | 244/118.5 |
| 4,708,030 | 11/1987 | Cordner | 74/686 |
| 4,733,155 | 3/1988 | Smith | 322/10 |
| 4,743,776 | 5/1988 | Baehler | 290/31 |
| 4,777,376 | 10/1988 | Dishner | 290/4 R |
| 4,875,345 | 10/1989 | Signoret | 62/402 |
| 4,993,663 | 2/1991 | Lahti et al. | 244/209 X |

FOREIGN PATENT DOCUMENTS

| | | |
|---|---|---|
| 0065855 | 5/1982 | European Pat. Off. . |
| 585341 | 9/1942 | United Kingdom . |
| 743598 | 4/1953 | United Kingdom . |
| 774695 | 4/1955 | United Kingdom . |
| 846358 | 6/1958 | United Kingdom . |
| 2127492 | 6/1983 | United Kingdom . |

OTHER PUBLICATIONS

Fluid-Dynamic Drag by: Signard F. Hoerner Published-1965 pp. 3-18, 3-19, 3-20 and 20-16.

*Primary Examiner*—Joseph F. Peters, Jr.
*Assistant Examiner*—Carla Mattix
*Attorney, Agent, or Firm*—Jerome C. Squillaro

[57] ABSTRACT

An aircraft gas turbine engine is provided with an electrically powered boundary layer air bleed apparatus for bleeding boundary layer air off the nacelle and the wing or another part of the aircraft outer skin in order to reduce boundary layer or surface drag and using the boundary layer air as a source of compressed air and cooling air for the aircraft's environmental control system (ECS).

10 Claims, 2 Drawing Sheets

AIRCRAFT ENGINE ELECTRICALLY POWERED BOUNDARY LAYER BLEED SYSTEM

BACKGROUND OF THE INVENTION

The invention generally relates to an aircraft gas turbine engine apparatus for bleeding boundary layer air from the wings and nacelles in order to reduce drag. In particular, the invention relates to an engine driven electrically powered apparatus for bleeding the boundary layer air and using the boundary layer bleed air for aircraft's environmental control system (ECS).

Aircraft aerodynamic drag poses a fuel consumption problem for aircraft designers. Aerodynamic drag causes a significant increase in an aircraft's specific fuel consumption and one component of the aerodynamic drag is boundary layer drag which is associated with engine nacelles, wing, pylons and other surfaces exposed to the free stream velocity which is about 600 miles per hour at cruise. As air flows on to and over a surface such as an engine nacelle it progressively builds up a low velocity boundary layer of increasing thickness. Within this boundary layer a portion of the velocity component of free stream total pressure is converted to increased static pressure. As the result of rise in static pressure, boundary layer thickness, and diffusion a point is reached where back pressure causes an otherwise laminar boundary layer to become turbulent.

Within the turbulent region a considerable amount of total pressure is converted to static temperature represented thermodynamically as an increase in entropy. By the time the boundary layer leaves the surface, or in the particular case of an aircraft gas turbine engine the end of the nacelle, an unrecoverable loss in total pressure has occurred The large entropy rise associated with turbulence is at the expense of air momentum. Turbulence also gives rise to increased static pressure which may increase the intensity of rearward acting pressure force on the surface. Now if the boundary layer thickness is kept small, separation and turbulence will not occur and drag can be substantially reduced.

One way to avoid increase in boundary thickness is to pump or bleed off boundary layer air through holes in the surface. Boundary layer pumps or compressors would be desirable from an aerodynamic standpoint but causes design problems related to weight and complexity because of the relatively large air flow rates associated with effective boundary layer pumping or bleeding. The concept has not been used for modern aircraft and engines because heretofore the specific fuel consumption benefits have been outweighed by the penalties associated with the added weight and complexity of proposed systems. One problem, addressed by the present invention, is that a boundary layer bleed system requires a great deal of extra equipment, particularly compressors, for drawing off or bleeding the boundary layer. Therefore the present invention proposes a solution to effectively reduce aerodynamic drag using boundary layer bleed with a minimal increase in the weight and complexity of the aircraft.

Modern day aircraft use gas turbine engines, which in addition to propulsion, provide secondary functions required by the aircraft systems. These secondary functions include electrical power, hydraulic power and aircraft bleed air. Bleed air is normally taken from the engine compressor and, after pre-cooling with engine fan air in a heat exchanger, is delivered to various aircraft systems such as the cowl and wing anti-ice system and the cabin pressurization and environmental control system for controlling cabin air freshness and temperature. These two systems are generally referred to as the anti-ice and ECS systems respectively. As part of the aircraft air ducting system, air is also routed in reverse flow to the engine where it powers an air turbine engine starter. Air for engine starting can be obtained from a ground cart, an on-board auxiliary power unit or bleed air from another engine.

Extraction of aircraft bleed air from the engine compressor has adverse affects on the propulsion cycle and engine life. Air taken into the engine compressor incurs a ram drag penalty (loss of momentum). Engine net thrust is equal to engine exhaust momentum minus inlet ram drag. Engine turbine power is needed to compress air and account for compressor inefficiency. Therefore, extra fuel consumption is always associated with bleed air (air which does not produce thrust).

This extra fuel burned in the engine combustor results in higher gas temperature delivered to the engine turbine and reduction of turbine blade life. Such penalties must be incurred in order that the engine turbine provide extra power associated with bleed air. It is not possible, without undue complexity, to always bleed the engine compressor stage which provides exactly the correct pressure needed for the aircraft anti-ice and ECS systems. Typically only two bleed ports are provided. Therefore, the result is to bleed air which exceeds minimum pressure requirements resulting in even higher penalty to the engine cycle than would be required by the aircraft systems. Most often the bleed air is not only at a higher than required pressure, it is also too hot. For reasons of fire safety, maximum bleed air temperature is usually limited to 450° to 500° F.

Temperature control requires cooling the bleed air with a pre-cooler. Most modern engines use fan air to cool compressor bleed air. Use of fan air imposes an additional penalty on fuel consumption. Further, the pre-cooler is usually large and requires a fan air scoop which produces drag. A typical large turbofan engine will consume about 3% extra fuel and run at about 50° F. hotter turbine temperature in order to provide aircraft system bleed air. The present invention addresses these problems and deficiencies characteristic of the prior art and conventional apparatus used to supply aircraft bleed air.

Another aspect of this invention concerns the engine air driven starter. Air starters are conventionally air powered turbines mounted to the engine accessory gearbox. The starter turbine rotates at very high speed and drives the engine through a planetary gear system during engine acceleration to just below idle speed. Once the engine lights it begins to develop its own power and, at a speed below idle, accelerates away from the starter. An overrunning mechanical clutch allows the starter to disengage and then the starter air is shut off and the starter turbine comes to rest. Within a very narrow flight profile of the aircraft, the starter can sometimes be used for emergency engine relight, but only at conditions where the windmill speed of the engine is low enough that the starter clutch can be engaged without damage due to what is referred to as crash engagement.

Engine starters can not be used during normal aircraft cruise conditions; where the only means for relight is from the freely windmilling engine. One advantage of the present invention is that it permits operation of the air starter during all aircraft flight conditions thereby avoiding the delay in engine relight which can be associated with flight conditions unfavorable for fast windmill relights. Therefore engine designers are looking to solve the problems of in flight engine restart with respect to the relatively narrow available flight profile and crash engagement of the engine starter.

Mechanically powered means for reducing boundary layer drag of various aircraft parts such as wings, nacelles, and aircraft tail assemblies have been proposed in the past and in patent application Ser. No. 07/489,150 entitled "AIRCRAFT ENGINE STARTER INTEGRATED BOUNDARY BLEED SYSTEM", invented by Samuel Davison, filed Mar. 6, 1990 and assigned to the same assignee and in a patent application Ser. No. 07/531,718 entitled "GAS TURBINE ENGINE POWERED AIRCRAFT ENVIRONMENTAL CONTROL SYSTEM AND BOUNDARY LAYER BLEED", invented by the same inventor of this patent, filed on Jun. 1, 1990, and assigned to the same assignee, both incorporated herein by reference. A patent application Ser. No. 07/531,734 entitled "GAS TURBINE ENGINE FAN DUCT BASE PRESSURE DRAG REDUCTION", invented by the same inventor of this patent, filed on Jun. 1, 1990, and assigned to the same assignee, and incorporated herein by reference proposes a mechanically powered means of bleeding boundary layer air and reducing the drag of the aircraft by introducing at least a portion of the pressurized bleed air into the fan duct of the engine to reduce the base drag of the duct.

OBJECTS OF THE INVENTION

It is, therefore, an object of the present invention to reduce the aerodynamic drag of aircraft.

It is a further object of the present invention to provide a more efficient and longer life aircraft gas turbine engine by reducing or eliminating the use of engine compressor bleed air.

Another object of the present invention is to provide a more efficient aircraft gas turbine engine by reducing or eliminating the use of gas turbine engine fan air for pre-cooling compressor bleed air used for the ECS system and anti-icing.

Another object of the present invention is to provide the engine with a quick and reliable in flight restart or relight capability.

Yet another object of the present invention is to provide the engine with a starter that avoids the need for crash engagement for in flight relight.

A further object of the present invention is to reduce aircraft drag with a simple, low weight, fuel efficient apparatus.

Yet a further object of the present invention is to reduce aircraft drag using already existing or required aircraft and engine components.

These objects and other features and advantages will become more readily apparent in the following description when taken in conjunction with the appended drawings.

SUMMARY OF THE INVENTION

Briefly, in accordance with one aspect of the present invention, an aircraft gas turbine engine is provided with an auxiliary electrical generator driven through a variable speed gearbox which runs off the high pressure rotor of a dual spool gas turbine engine and is used to electrically power boundary layer air bleed compressors which are in fluid receiving communication with outer surfaces of the aircraft.

A more particular embodiment provides means for bleeding boundary layer air from an engine nacelle and an aircraft's wings wherein the nacelle boundary layer air bleed means includes a plurality of compressors located in a plenum in a forward portion of the nacelle which has a perforated skin through which the boundary is bled and the boundary layer air on the wings is similarly bled through a perforated skin by electrically powered ECS compressors used to provide ECS air for the aircraft's cabin and cooling air for the heat exchanger in the ECS system.

A more particular embodiment includes an air turbine mounted on a common shaft with the auxiliary generator and having a variable inlet in the form of variable inlet guide vanes for controlling the amount of flow admitted to the air turbine. An electronic controller is provided to control the operation of the variable inlet. The air turbine is in switchable fluid receiving communication with sources of compressed starting air which are capable of providing compressed air for both on ground and in flight engine starting. The bleed system includes a means for controllably ducting the air turbine exhaust flow to a means for supplying compressed air to the anti-icing duct and the environmental control system (ECS).

And another embodiment includes a means for dumping the boundary layer bleed air into a low pressure region of the fan duct that produces base pressure drag on the engine such as the aft end of the pylon fairing.

DETAILED DESCRIPTION OF THE INVENTION

Figure 1:
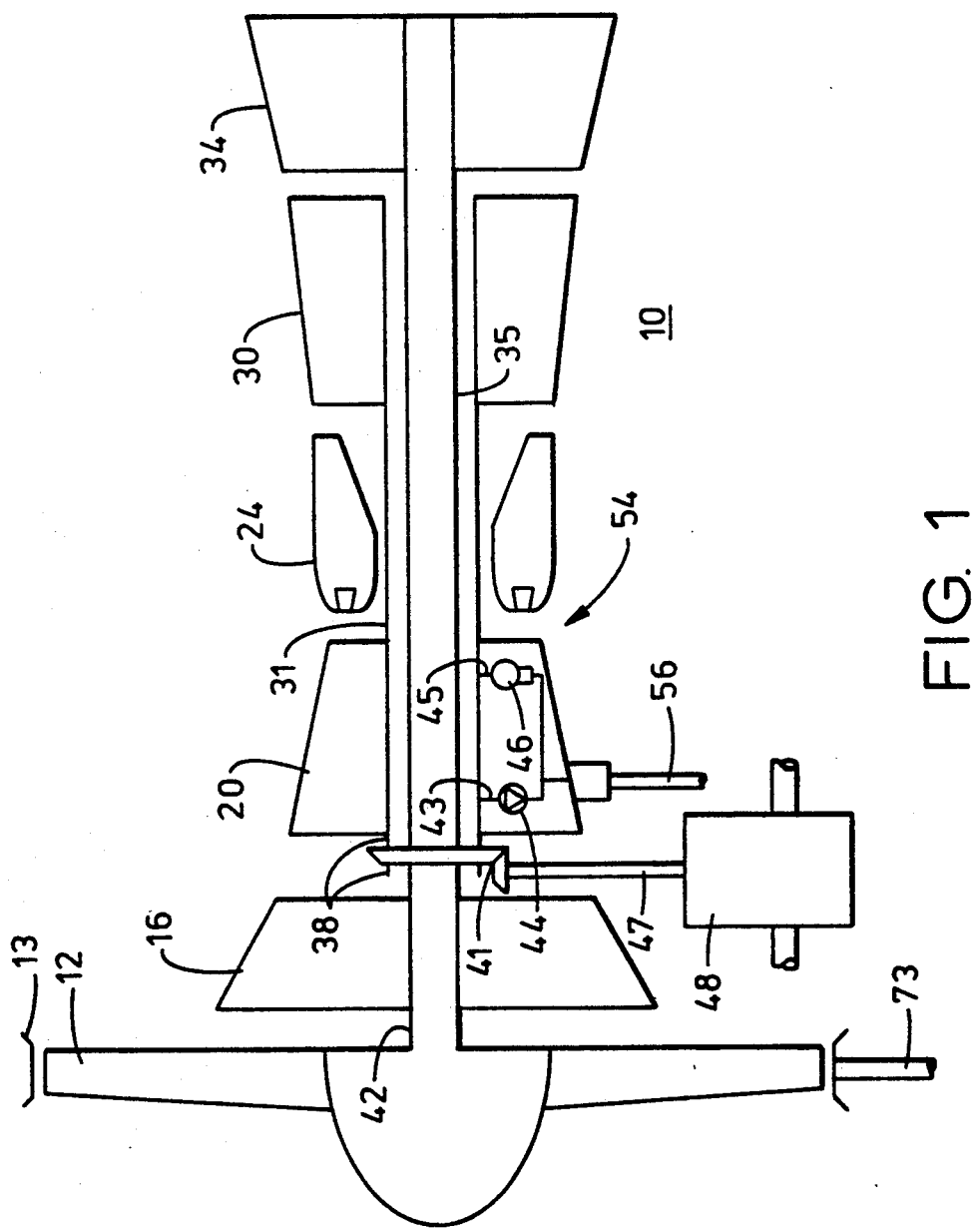
FIG. 1 is a schematic representation of an aircraft dual rotor gas turbine engine

FIG. 1 illustrates a typical gas turbine engine 10 having in serial flow relationship a fan section 12, a low pressure compressor (LPC) 16, a high pressure compressor (HPC) 20, a combustion section 24, a high pressure turbine (HPT) 30, and a low pressure turbine (LPT) 34. A high pressure rotor 31 includes high pressure (HP) shaft 38 which connects, in driving relationship HPT 30 to HPC 20 and a low pressure rotor 35 includes a low pressure shaft 42 disposed within high pressure (LP) shaft 38 which drivingly connects LPT 34 to LPC 16 and fan 12. A power takeoff shaft 47 drivingly connects HP shaft 38 to a constant speed drive 48 through a transfer gearbox depicted by the 45 degree bevel gears generally shown at their point of intersection 41.

A compressor bleed means 54, in FIG. 1, includes a mid-compressor bleed line 43, i.e. a eighth stage bleed for a General Electric CF6-80C2, and a compressor discharge bleed line 45 manifolded together and ducted out of HPC 20 by a compressor bleed duct 56. Disposed in mid-compressor bleed line 43 is a check valve 44 which prevents higher pressure air from compressor discharge bleed line 45, which has a pressure actuated shut off valve 46 disposed within, from flowing into a midstage of the compressor back through mid-compressor bleed line 43. Although the present invention eliminates or reduces the need for compressor air to be used by the ECS, there are certain operating conditions when this is required.

Therefore, during idle operation of the gas turbine engine 10 air from compressor discharge bleed line 45 may be used for anti-icing and, if required, for ECS makeup air. During the rest of the engine's operation compressor bleed air is supplied from mid-compressor bleed line 43 to compressor bleed duct 56.

Figure 2:
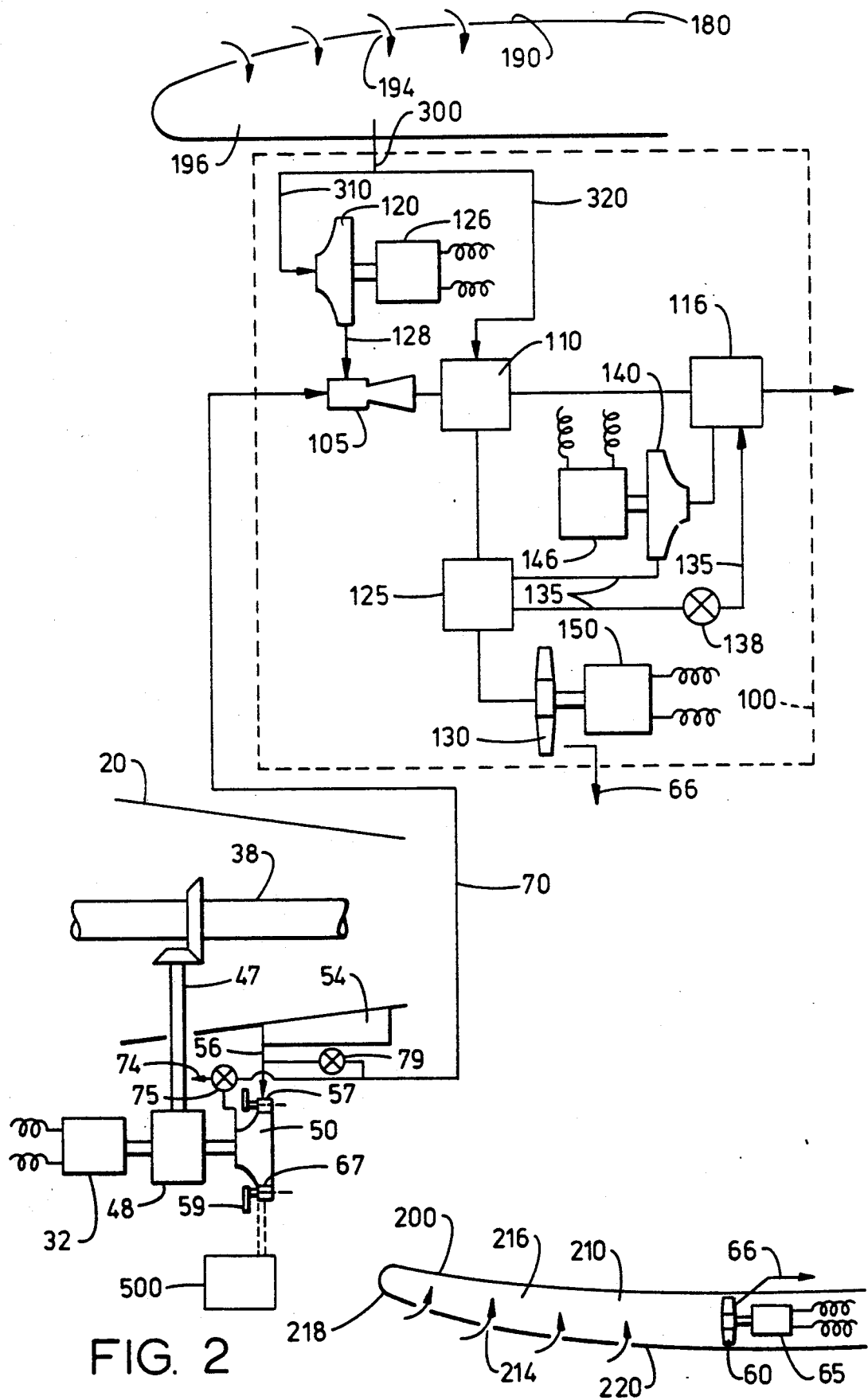
FIG. 2 is a schematic representation of the preferred embodiment of the present invention.

FIG. 2 schematically depicts the preferred embodiment of the present invention for a wing mounted aircraft gas turbine engine 10. The preferred embodiment provides an electrical power supply means generally shown in its specific embodiment as an electrical generator 32 drivenly connected through a constant speed drive 48 and power takeoff shaft 47 to HP shaft 38 and used for powering boundary layer bleed apparatus and ECS systems. The ECS system incorporates an ECS pack 100 conventionally located in an ECS bay (not shown) in the aircraft. ECS pack 100 has its various components depicted within the dotted rectangle in FIG. 2 and is described in more detail below.

The preferred embodiment, as shown in FIG. 2 is provided with an aircraft boundary layer bleed means having a nacelle boundary layer bleed means 216, including a perforated skin 214 that surrounds a forward nacelle portion 220 having disposed within it a nacelle plenum 210 for bleeding a portion of the boundary layer from the forward portion of the nacelle 220. Forward nacelle portion 220 extends aft from about the nacelle leading edge 218. Nacelle plenum 210 is in fluid supply communication with a nacelle boundary layer compressor means which in the preferred embodiment is a plurality of nacelle boundary layer compressors 60 disposed around and within nacelle 220. Nacelle boundary layer compressor 60 is driven by an electric motor 65 which receives its power from electrical generator 32 and may be integrally mounted within a common casing with boundary layer compressor 60 so as to form an easily serviceable unit. In the preferred embodiment, boundary layer compressor 60 is a centrifugal compressor which dumps to a low pressure region of the engine 66 such as in the fan bypass duct 13, schematically depicted in FIG. 1, where it may be used for thrust and reduction of localized fan duct base pressure drag as discussed in the previously referenced patent applications.

The preferred embodiment further provides an electrically powered wing boundary layer bleed means generally shown at 185 which provides air for both cabin air and heat exchanger air cooling purposes. Boundary layer bleed means 185 includes a forward wing portion 190 of aircraft wing 180 wherein the forward portion is covered with a perforated wing skin 194 disposed about a wing plenum 196 which exhausts to ECS cooling duct 300 which splits into a first and second trunk line 310 and 320 respectively. A cabin air compressor 120, driven by an electric motor 126 which is powered by electrical generator 32, bleeds off and receives wing boundary layer air from first trunk line 310 which it then conveys to the aircraft cabin generally shown in FIG. 2 as arrow 167 after it has been cooled in air heat exchanger 110 and freon cycle air conditioner heat exchanger 116. Heat exchanger cooling air for air heat exchanger 110 and freon cycle air conditioner heat exchanger 116 in ECS pack 100 is supplied by the boundary layer bleed system through second trunk line 320 and is further explained below. An ejector type mixer 105 is disposed between cabin air compressor 120 and heat exchanger 110 and is operable to receive, if required, makeup air from compressor bleed means 54 ducted through multi-function duct 70.

A preferably freon cycle cooling system 135 is contained within ECS pack 100 for additional cooling of the cabin air. An electrically operated freon compressor 140 is driven by an electrical motor 146 which is powered by electrical generator 32. Further included in the freon circuit of freon cycle cooling system 135, in serial flow relationship with freon compressor 140, is condenser 125 and expansion valve 138. Condenser 125 is air cooled by air bled off the wing through trunk line 320 by cooling air compressor 130 which is driven by electrical motor 150 which in turn is powered by electrical generator 32.

The use of electrically powered boundary layer bleed compressors 120 and 130 eliminates or reduces the need for additional machinery to bleed boundary layer air and thereby provides a practical solution to one of the problems associated with prior aircraft boundary layer bleed systems. The use of an electrical generator 32 to also power the freon cycle cooling system 135 further enhances the solution set forth in the present invention solution. Electrical powered apparatus are also reliable, low cost, and easily maintained.

Using the exhaust of boundary layer bleed air which has been compressed by nacelle boundary layer compressors 60 and cooling air compressor 130 to reduce base pressure drag provides the advantage of further improving the invention's overall efficiency.

The invention eliminates or reduces the need for conventional bleed air precoolers which use fan air to cool compressor bleed air which is conventionally used to provide air for the ECS and anti-icing systems. Starting air turbine 50 expands and therefore cools the compressor bleed air received from compressor bleed means 54 thereby reducing or eliminating the need for a bleed air pre-cooler as found in conventional ECS systems if the system is properly sized and designed.

An air turbine 50, preferably a single stage radial inflow air turbine, having turbine variable inlet 57 preferably of the variable vane type is connected in reversible driving relationship, preferably through constant speed drive 48 and power takeoff shaft 47, to HP shaft 38. Compressor bleed means 54 on engine 10 is connected in fluid supply communication by a compressor bleed duct 56 to turbine variable vane inlet 57.

A starting supply valve 59, conventionally ducted to air turbine variable vane inlet 57 through a multi-function duct 70, provides sources of starting air including in flight sources such as crossbleed systems from other engines. Disposed in multifunction duct line 70 is a switchable starting air dump valve 75 having a overboard dump line 74. Air turbine dump line 74 whose operation is controlled by turbine dump valve 75 is provided for dumping air turbine exhaust during engine starting when compressed air is provided to air turbine 50 through multi-function duct line 70 by starting air supply valve 59. Multi-function duct line 70 is known in the art and is conventionally referred to as a bleed air duct and is conventionally used to supply compressor bleed air for ECS systems and anti-icing.

Air turbine 50 includes turbine variable vane inlet 57 and controller 500 to control the amount of flow through air turbine 50 which during normal cruise conditions only requires a small amount of air flow to cool the turbine and other parts. During abnormal conditions when the aircraft's ECS cannot provide all the required air flow to the cabin, air turbine 50 is used to cool air from compressor bleed means 54 and duct it through multi-function duct line 70 to ECS pack 100. Air turbine 50 may also be used to provide anti-icing air through multi-function duct line 70. Closed loop controller 500 responds to signals indicating temperature and pressure in line 70. Closed loop controller 500 closes and opens turbine variable vane inlet 57, like the iris on a camera lens, in order to prevent over heating or over pressuring multi-function duct line 70 which is also used to provide air for anti-icing. During engine ground start operation of the invention illustrated in FIGS. 1 and 2 air turbine 50 operates as a conventional air starting turbine receiving compressed starting air from multi-function duct line 70. Starting air is then dumped overboard by starting air dump valve 75 through line 74. The power created from air turbine 50 cranks HPT shaft 38 through constant speed drive 48 until engine 10 is capable of continuing operation without assist from air turbine 50. At this point of the engine's operation air turbine 50 continues to rotate driven by HP shaft 38 and turbine variable inlet 57 is closed down by controller 500 to a point which provides only enough compressor air for cooling air turbine 50 and preventing heat damage to its components such as its rotor. The present invention in this aspect is unlike conventional starters which employ some sort of clutch mechanism after engine start to disconnect the starting turbine. Starting air valve 59 is then returned to a position which allows compress or bleed air to be supplied through multi-function duct line 70 for use as and for makeup air in the ECS system if required.

The present invention has been described in an illustrative manner. It is to be understood that the terminology which has been used is intended to be in the nature of words of description rather than of limitation. It is important to note the multifunctionality ascribed to many elements of the invention such as ducts, valves, fans, and compressors which provide the advantages of decreased engine and aircraft specific fuel consumption and lower aircraft drag. The invention contemplates using the energy recovery system and the wing, the nacelle, and the combination nacelle and tail assembly boundary layer bleed systems individually as well as in combination in various embodiments of the present invention.

Obviously, many modifications and variations of the present invention are possible in light of the above teachings. It is, therefore, to be understood that within the scope of the appended claims, the present invention may be practices otherwise than as specifically described.

What is claimed is:

1. An apparatus for bleeding boundary layer air from a portion of the outer surfaces of a gas turbine engine powered aircraft, wherein said apparatus comprises:
   an electrically powered bleed air compressor means in fluid supply communication with the aircraft's outer surface and effective for bleeding boundary layer air from the aircraft's outer surface and powered by an aircraft gas turbine engine powered electrical generator,
   said bleed air compressor means comprising an electrically powered nacelle compressor means in fluid supply communication with a portion of the aircraft's outer surface on an engine nacelle and effective for bleeding boundary layer air from the nacelle's outer surface, and
   said bleed air compressor means further comprising an electrically powered environmental control system air supply compressor in fluid supply communication with a portion of the aircraft wing's outer surface and effective for bleeding boundary layer air from said portion of the wing's outer surface and for supplying aircraft cabin air.

2. An apparatus as claimed in claim 1 wherein said bleed air compressor means further comprises an electrically powered environmental control system heat exchanger compressor in fluid supply communication with said portion of the aircraft wing's outer surface and effective for bleeding boundary layer air from the wing's outer surface and for supplying environmental control system heat exchanger cooling air.

3. An apparatus as claimed in claim 2 further comprising a constant speed drive drivingly connected to said aircraft gas turbine engine powered electrical generator and drivenly connected in a reversible manner to a starting air turbine having a variable area inlet.

4. An apparatus as claimed in claim 3 further comprising a bleed air duct means in fluid supply communication with said starting air turbine wherein said bleed air duct means is used to supply compressed air for anti-icing and for cabin air.

5. An apparatus as claimed in claim 4 wherein said starting air turbine variable area inlet is controlled by an inlet control means.

6. An apparatus as claimed in claim 5 wherein said inlet control means is an electronic control means.

7. An apparatus as claimed in claim 2 further comprising an environmental control system mixer in fluid communication with both an exhaust outlet of said environmental control system air supply compressor and an engine bleed duct wherein said mixer is effective for receiving and mixing boundary layer bleed air from said environmental control system air supply compressor with compressed air from said engine bleed duct.

8. An apparatus as claimed in claim 7 further comprising a constant speed drive drivingly connected to said aircraft gas turbine engine powered electrical generator and drivenly connected in a reversible manner to a starting air turbine having a variable area inlet, and
   wherein said engine bleed duct is in fluid supply communication with said starting air turbine wherein said engine bleed duct is effective for supplying compressed air for anti-icing and for cabin air.

9. An apparatus as claimed in claim 8 wherein said starting air turbine variable area inlet is controlled by an electronic control means.

10. An apparatus as claimed in claim 9 further comprising an electrically powered environmental control system air conditioning compressor powered by said generator.

* * * * *